United States Patent
Tung et al.

(10) Patent No.: US 7,602,655 B2
(45) Date of Patent: Oct. 13, 2009

(54) EMBEDDED SYSTEM

(75) Inventors: Chien-Hsun Tung, Taichung (TW); You-Wen Chang, Hsinchu (TW); Li-Lien Lin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 286 days.

(21) Appl. No.: 11/539,209

(22) Filed: Oct. 6, 2006

(65) Prior Publication Data

US 2007/0174495 A1 Jul. 26, 2007

Related U.S. Application Data

(60) Provisional application No. 60/743,126, filed on Jan. 12, 2006.

(51) Int. Cl.
*G11C 7/00* (2006.01)

(52) U.S. Cl. .............. 365/189.17; 365/189.08; 365/230.02; 365/230.08

(58) Field of Classification Search .............. 365/189.2, 365/189.17, 189.08, 230.08, 230.02
See application file for complete search history.

(56) References Cited

U.S. PATENT DOCUMENTS

| | | | |
|---|---|---|---|
| 4,879,688 A | | 11/1989 | Turner et al. |
| 5,650,734 A | | 7/1997 | Chu et al. |
| 5,680,061 A | | 10/1997 | Veenstra et al. |
| 5,734,868 A | | 3/1998 | Curd et al. |
| 5,812,662 A | | 9/1998 | Hsu et al. |
| 5,869,980 A | | 2/1999 | Chu et al. |
| 5,949,987 A | | 9/1999 | Curd et al. |
| 6,134,707 A | * | 10/2000 | Herrmann et al. ........... 717/139 |
| 6,170,043 B1 | | 1/2001 | Hu |
| 6,259,271 B1 | * | 7/2001 | Couts-Martin et al. ........ 326/40 |
| 6,373,771 B1 | * | 4/2002 | Fifield et al. ............ 365/225.7 |
| 6,507,881 B1 | | 1/2003 | Chen |
| 6,683,817 B2 | * | 1/2004 | Wei et al. ............... 365/230.03 |
| 6,691,143 B2 | | 2/2004 | Blaker |
| 6,732,246 B2 | | 5/2004 | Okaue |

(Continued)

FOREIGN PATENT DOCUMENTS

CN 1166650 12/1997

(Continued)

OTHER PUBLICATIONS

Satoh et al.; "A Scalable Dual-Field Elliptic Curve Cryptographic Processor" IEEE Transactions on Consumer Computers, vol. 52, No. 4, Apr. 2003.

(Continued)

*Primary Examiner*—Tuan T Nguyen
*Assistant Examiner*—Hien N Nguyen
(74) *Attorney, Agent, or Firm*—Thomas, Kayden, Horstemeyer & Risley

(57) ABSTRACT

An embedded system for programming a programmable device including a micro controller and an I/O interface. The programmable device includes a pin set for signal delivery. The micro controller device controls the programmable device via the pin set. The I/O interface receives a program code provided externally. The micro controller executes a command sequence to program the program code into the programmable device via the pin set, and the programmable device uses the program code to provide the specific function. The command sequence may also be provided externally and sent to the micro controller via the well-known general I/O interface.

10 Claims, 4 Drawing Sheets

U.S. PATENT DOCUMENTS

| | | | |
|---|---|---|---|
| 6,820,105 | B2 | 11/2004 | Blaker |
| 6,963,644 | B1 | 11/2005 | Matsuzaki et al. |
| 7,046,570 | B1 | 5/2006 | Hubbard |
| 2005/0105331 | A1 | 5/2005 | Lee et al. |
| 2006/0202232 | A1 | 9/2006 | Takami |
| 2007/0153609 | A1 | 7/2007 | Wu et al. |
| 2007/0162964 | A1* | 7/2007 | Wang et al. .................... 726/5 |
| 2007/0180165 | A1* | 8/2007 | Chao et al. .................... 710/62 |
| 2007/0198824 | A1* | 8/2007 | Chen et al. .................. 713/150 |

FOREIGN PATENT DOCUMENTS

| | | |
|---|---|---|
| CN | 2501159 | 7/2002 |
| CN | 1700637 | 11/2005 |

OTHER PUBLICATIONS

CN Office Action, mailed May 30, 2008.

Notice of Allowance issued Nov. 3, 2008 in pending U.S. Appl. No. 11/563,236.

* cited by examiner

EMBEDDED SYSTEM

BACKGROUND OF THE INVENTION

1. Field of the Invention

The invention relates to DVD-ROMs, and more particularly, to programming a device with a reduced number of pins in an embedded system.

2. Description of the Related Art

FIG. 1 shows a conventional embedded system 100 with an externally coupled program provider 110. The embedded system 100 may be part of a DVD-ROM storing copyright information, or part of a general purpose digital device executing various applications programmed therein. The embedded system 100 typically comprises a program controller 120 and a programmable device 130. The program controller 120 accesses the programmable device 130 via a plurality of pins 105. The definition of each pin 105 is dependent on the type of device 130. When the programmable device 130 needs to be programmed with a specific application, a program code #DATA corresponding to the application is provided externally through a program provider 110. Conventionally, additional control pins such as 107 and 109 are required to perform the programming, through which the program provider 110 directly connects to the programmable device 130. One or more multiplexers 103 may be implemented on each pin 105, selecting signals from the program provider 110 or program controller 120 as an input to the programmable device 130. When programming, the multiplexers 103 select signals delivered via the control pins 107 to program the programmable device 130, while some additional signals are directly sent via the control pins 109. In some cases, the program provider 110 directly connects the program controller 120 by a bus 101, and the program controller 120 may comprise a level shifter (not shown) to map signals delivered via the bus 101 to each pin 105. The control pins 107 and 109 are still indispensable in the conventional architecture. There may be various types of programmable device 130, each conforming to different pin standards, and the program provider 110 performs the programming by executing a command sequence #CMD specifically designed for the programmable device. The layout of the control pins 105, 107 and 109 are also type dependent, as well as the signal protocol used by the program provider 110 and program controller 120. This architecture is deemed inflexible because the program provider 110, program controller 120 and corresponding pins can not provide compatibility when the programmable device 130 needs upgrade. Thus, a flexible architecture is desirable.

BRIEF SUMMARY OF THE INVENTION

An exemplary embodiment of an embedded system comprises a programmable device, a micro controller and an I/O interface. The programmable device consists of a pin set for signal delivery. The micro controller device controls the programmable device via the pin set. The I/O interface receives an externally provided program code. The micro controller executes a command sequence to program the program code into the programmable device via the pin set, and the programmable device executes the program code to provide the specific function. The command sequence may also be provided externally and sent to the micro controller via the I/O interface.

The embedded system may further comprise a first memory device coupled to the I/O interface and micro controller. The program code is received from the I/O interface and stored in the first memory device. When programming the programmable device, the micro controller reads the program code from the first memory device and writes to the programmable device. The command sequence is also stored in the first memory device when provided. When programming the programmable device, the micro controller reads the command sequence from the first memory device and executes it to perform the programming. The first memory device is a volatile memory device or a DRAM.

Alternatively, the embedded system further comprises a second memory device coupled to the micro controller, storing the command sequence; wherein when programming the programmable device, the micro controller reads the command sequence from the second memory device and executes it to perform the programming. The second memory device is a nonvolatile memory device, a FLASH or an EEPROM.

The embedded system may be a DVD-ROM. The programmable device is an e-fuse or a one time programmable chip that can only be programmed once or re-programmable device that can be programmed many times. The program code comprises confidential information to be protected, and the specific function is storage of the confidential information modification of which is disallowed. The I/O interface is an IDE interface, a SATA interface or a well-known general interface. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
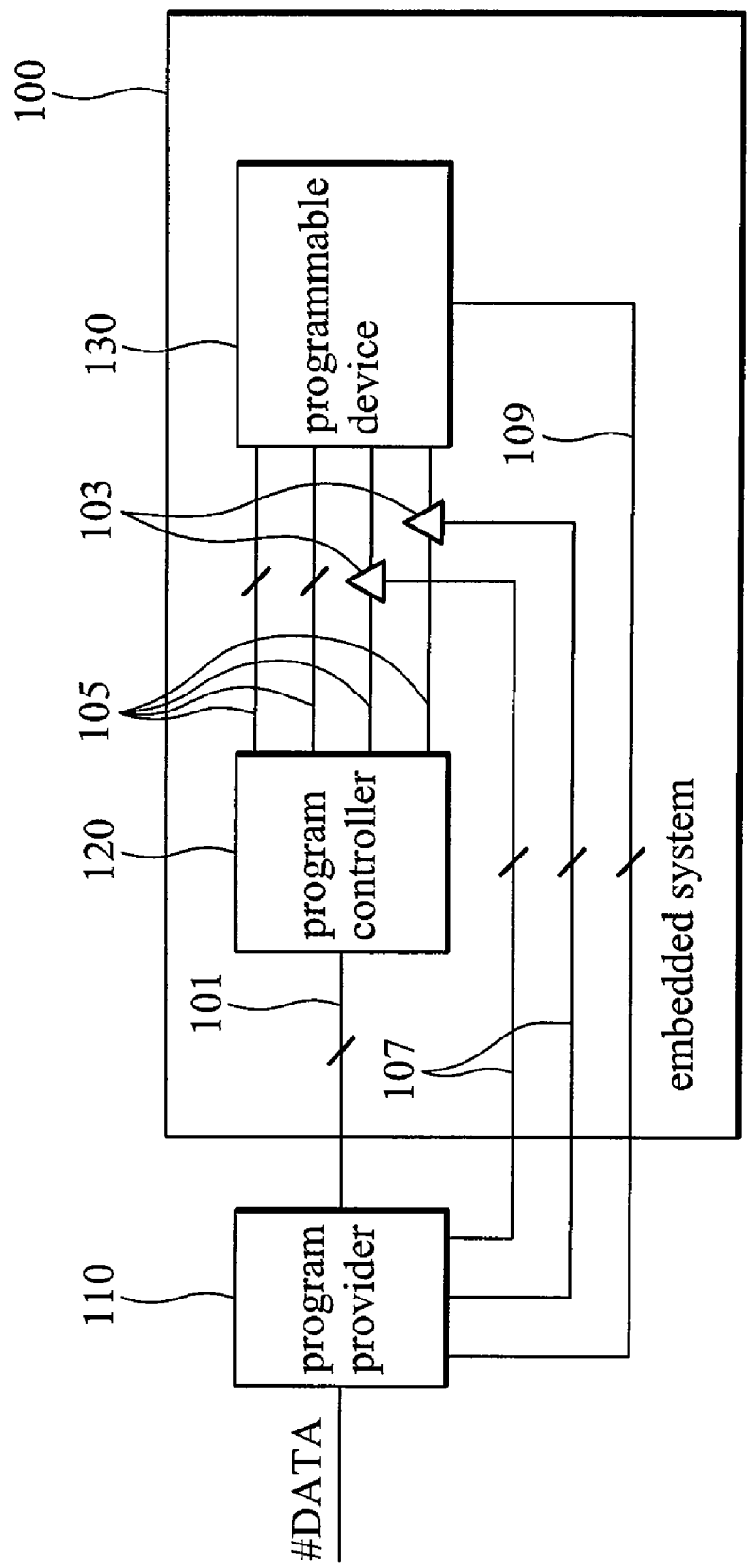
FIG. 1 shows a conventional embedded system 100 with an externally coupled program provider 110.
Figure 2:
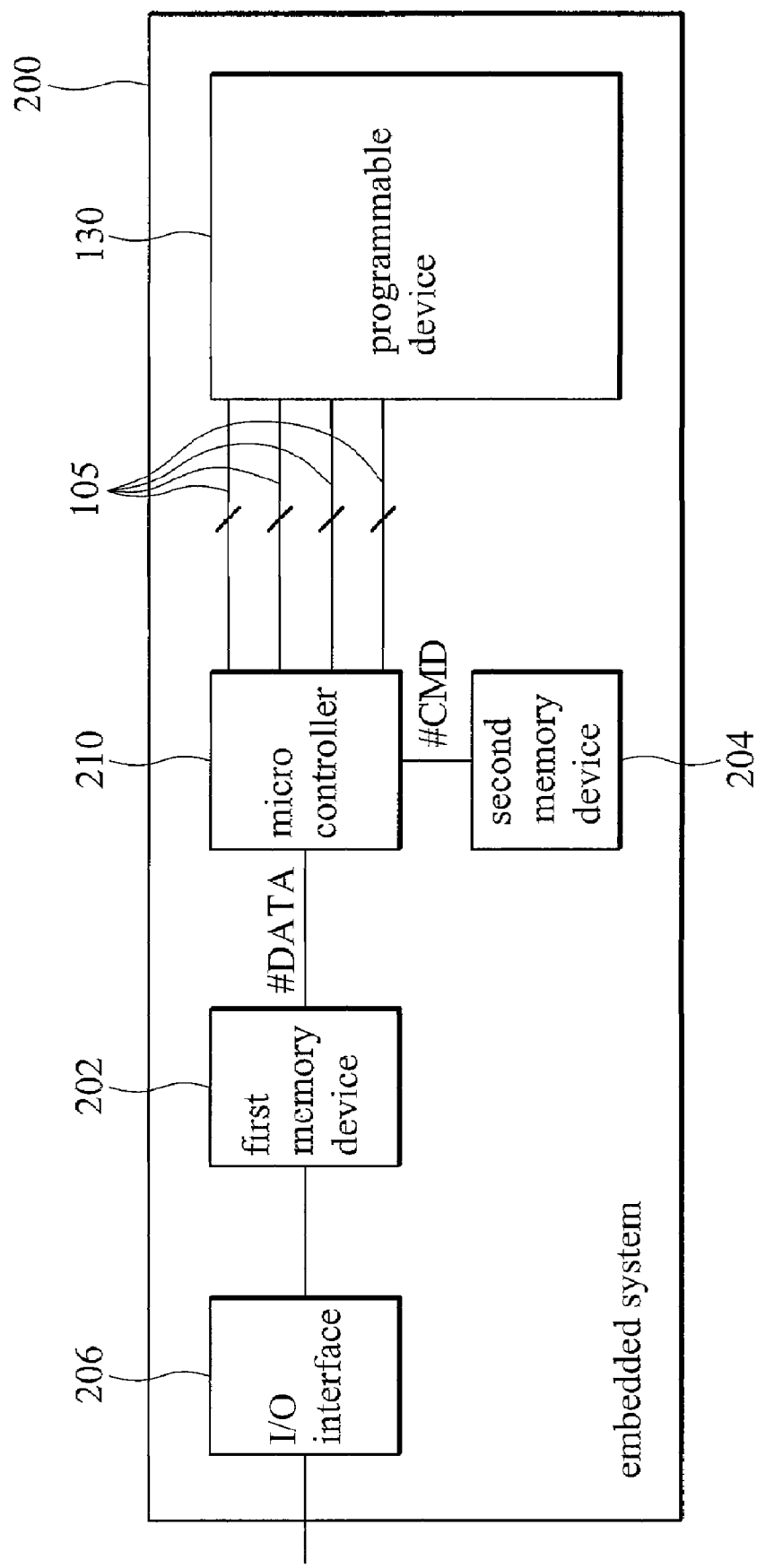
FIGS. 2, 3 and 4 show embodiments of embedded system according to the disclosure.

FIG. 2 shows an embodiment of an embedded system 200. A micro controller 210 is provided, dedicated to controlling programmable device 130 over a plurality of pins 105. In this way, no additional pins such as 107 and 109 are required to program the programmable device 130. Furthermore, the command sequence #CMD executed by the micro controller 210 is replaceable, thus, when the programmable device 130 is upgraded to a different type, the micro controller 210 can still perform the programming by executing a corresponding command sequence #CMD of the type. In the embedded system 200, the programmable device 130 performs program defined functions. For example, the programmable device 130 may be a one time programmable device for storage of copyright information or confidential information that modifications thereof are permanently disallowed. The programmable device 130 is directly connected to the micro controller 210 by a set of pins 105. The pins 105 may be type dependent, thus detailed signal description of each pin is not described herein. The micro controller 210 may comprise a lookup table flexibly defining protocols of each pin 105 according to the type of programmable device 130, thus when the programmable device 130 is upgraded, the micro controller 210 can still adapt to it without being outdated. In the embedded system 200, an I/O interface 206 is coupled to the micro controller 210, receiving a program code #DATA provided externally. The program code #DATA may be a sequence of instructions executable for the programmable device 130, or a data block to be stored in the programmable device 130. In a programming procedure, the micro controller 210 executes the command sequence #CMD to program the program code #DATA into the programmable device 130 via the pins 105, such that the specific function can be served by the programmable device 130 with the program code #DATA.

In FIG. 2, the command sequence #CMD is stored in a second memory device 204 as a firmware. The second memory device 204, for example, may be a nonvolatile memory device such as a FLASH or an EEPROM. A first memory device 202 coupled to the I/O interface 206 and micro controller 210, may be a volatile memory device such as a DRAM. When the I/O interface 206 receives the program code #DATA, it is temporally stored in the first memory device 202. When the programming procedure begins, the micro controller 210 executes the command sequence #CMD stored in the second memory device 204, and in response, the program code #DATA in the first memory device 202 is read and written to the programmable device 130 by the micro controller 210.

Figure 3:
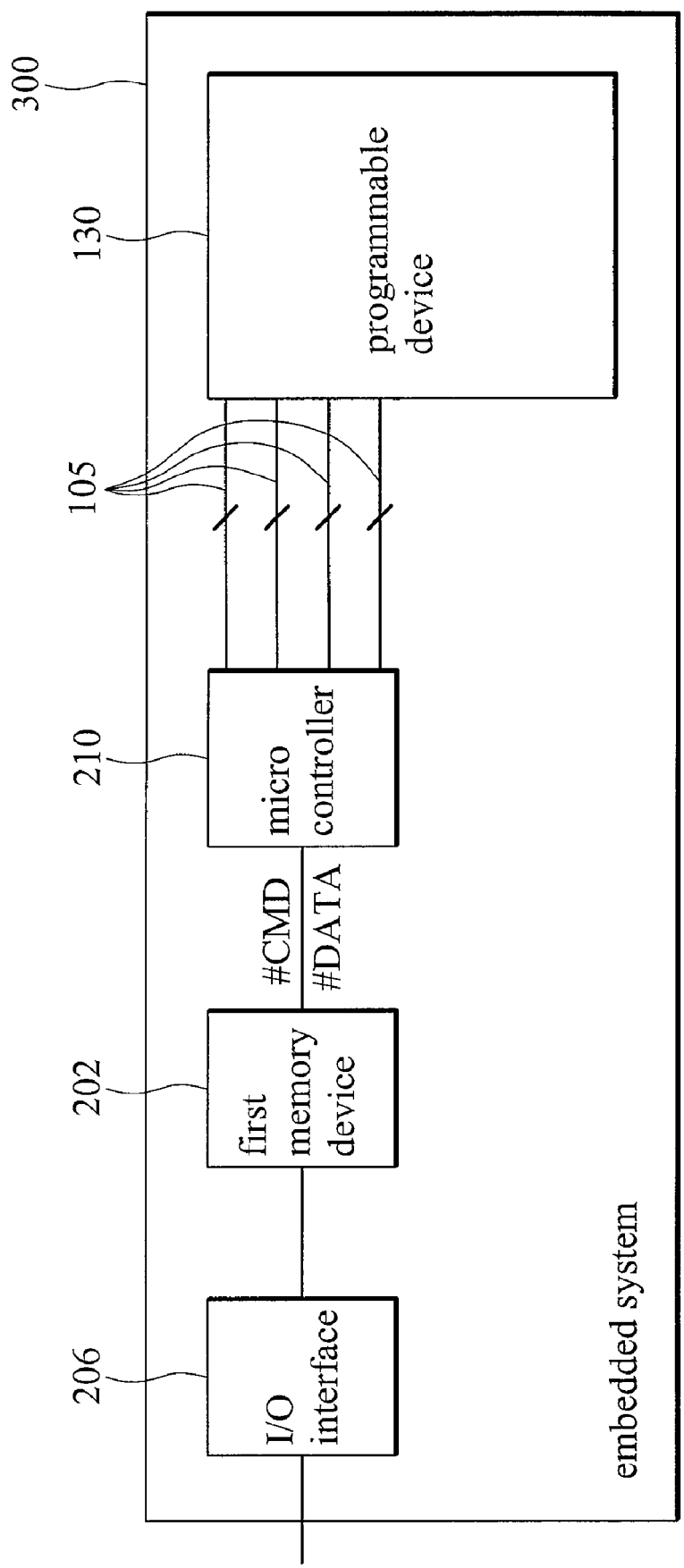

FIG. 3 shows an embodiment of an embedded system 300. The embedded system 300 does not comprise the second memory device 204. Thus, the command sequence #CMD is also provided externally via the I/O interface 206 and stored in the first memory device 202. When the programming procedure begins, the micro controller 210 reads the command sequence #CMD from the first memory device 202 and executes it to perform the programming.

Figure 4:
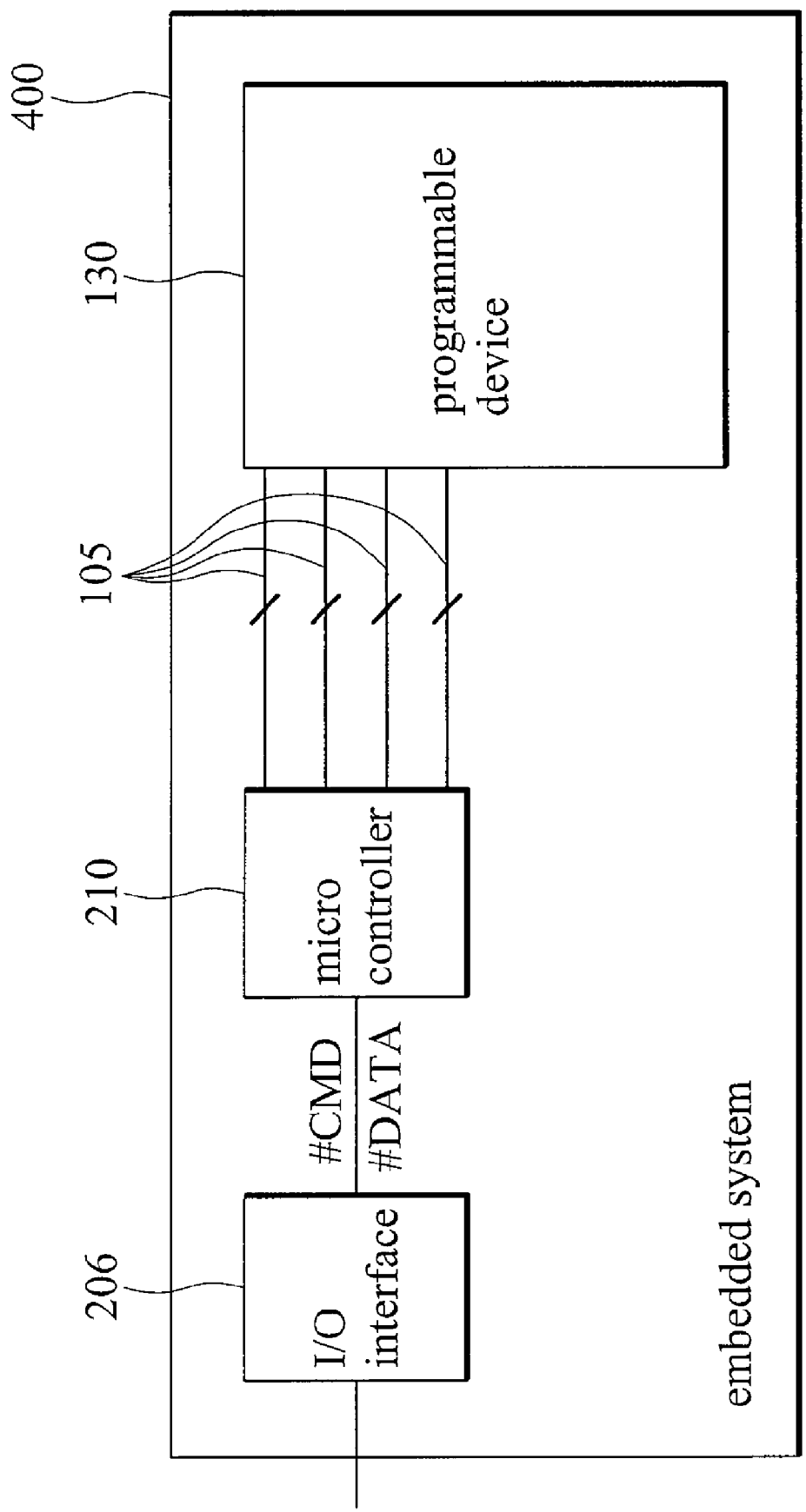

FIG. 4 shows an embodiment of an embedded system 400. The embedded system 400 further excludes the first memory device 202 as shown in FIG. 3. The micro controller 210 is directly triggered to perform a programming procedure upon receipt of the command sequence #CMD and program code #DATA. If the embedded system 200 is a DVD-ROM, the programmable device 130 may be an e-fuse or a one time programmable chip that can only be programmed once, and the program code #DATA is the confidential information to be protected. When the programmable device 130 is programmed with the confidential information, modification thereof is unallowable and the copyright is protected. As an example, the I/O interface 206 may be an IDE interface, a SATA interface or a network interface. In this way, the program code #DATA can be flexibly provided from various sources such as the Internet or portable devices.

The disclosure provides a simplified architecture with more compatibility and flexibility for programmable devices. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded system, comprising:
   a programmable device, storing program codes, consisting of a pin set for signal delivery,
   a micro controller, connected to the programmable device, controlling the programmable device via the pin set;
   an I/O interface, coupled to the micro controller, receiving a program code provided externally, in which a specific function is defined; wherein:
   the micro controller executes a command sequence to program the program code into the programmable device via the pin set; and
   the programmable device stores the programmed program code to provide the specific function.

2. The embedded system as claimed in claim 1, wherein the command sequence is provided externally and sent to the micro controller via the I/O interface.

3. The embedded system as claimed in claim 1, further comprising a first memory device coupled to the I/O interface and micro controller; wherein:
   the program code is received from the I/O interface and stored in the first memory device; and
   when programming the programmable device, the micro controller reads the program code from the first memory device and writes to the programmable device.

4. The embedded system as claimed in claim 3, wherein:
   the command sequence is provided externally via the I/O interface and stored in the first memory device; and
   when programming the programmable device, the micro controller reads the command sequence from the first memory device and executes it to perform the programming.

5. The embedded system as claimed in claim 3, wherein the first memory device is a volatile memory device or a DRAM.

6. The embedded system as claimed in claim 3, further comprising a second memory device coupled to the micro controller, storing the command sequence; wherein when programming the programmable device, the micro controller reads the command sequence from the second memory device and executes it to perform the programming.

7. The embedded system as claimed in claim 6, wherein the second memory device is a nonvolatile memory device, a FLASH or an EEPROM.

8. The embedded system as claimed in claim 1, wherein the embedded system is an optical storage device.

9. The embedded system as claimed in claim 8, wherein:
   the programmable device is an e-fuse or a one time programmable chip that can only be programmed once;
   the program code comprises confidential information to be protected; and
   the specific function is storage of the confidential information of which modification is unallowable.

10. The embedded system as claimed in claim 1, wherein the I/O interface is an IDE interface, a SATA interface or a network interface.

* * * * *